United States Patent [19]

Phillips et al.

[11] Patent Number: 5,047,959
[45] Date of Patent: Sep. 10, 1991

[54] FLEXIBLE DATA DISPLAY

[75] Inventors: Timothy T. Phillips, Edgewood; Deborah C. Cummings, Villa Hills; Emily S. Divita, Erlanger, all of Ky.; Steve M. Bryan, Cincinnati, Ohio

[73] Assignee: Square D Company, Palatine, Ill.

[21] Appl. No.: 244,052

[22] Filed: Sep. 13, 1988

[51] Int. Cl.[5] .............................................. G06F 15/20
[52] U.S. Cl. .................................................. 364/521
[58] Field of Search ... 364/518, 521, 523, 200 MS File, 364/900 MS File; 382/16, 25; 340/721, 723, 798-800

[56] References Cited

U.S. PATENT DOCUMENTS

| | | | |
|---|---|---|---|
| 4,027,246 | 5/1977 | Caccoma | 235/151.1 |
| 4,068,300 | 1/1978 | Bachman | 364/200 |
| 4,322,157 | 3/1982 | Miura et al. | 364/523 |
| 4,383,298 | 5/1983 | Huff et al. | 364/300 |
| 4,435,777 | 3/1984 | McCaskill et al. | 364/900 |
| 4,435,778 | 3/1984 | Cason et al. | 364/900 |
| 4,459,663 | 7/1984 | Dye | 364/200 |
| 4,459,678 | 7/1984 | McCaskill et al. | 364/900 |
| 4,464,719 | 7/1984 | Spellmann | 364/300 |
| 4,500,963 | 2/1985 | Smith et al. | 364/300 |
| 4,580,228 | 4/1986 | Noto | 364/491 |
| 4,581,710 | 4/1986 | Hasselmeier | 364/200 X |
| 4,591,983 | 5/1986 | Bennett et al. | 364/403 |
| 4,593,363 | 6/1986 | Burstein et al. | 364/491 |
| 4,600,995 | 7/1986 | Kinoshita | 364/491 |
| 4,615,011 | 9/1986 | Linsker | 364/491 |
| 4,636,966 | 1/1987 | Yamada et al. | 364/491 |
| 4,646,238 | 2/1987 | Carlson, Jr. et al. | 364/403 |
| 4,646,250 | 2/1987 | Childress | 364/521 X |
| 4,648,023 | 3/1987 | Powell | 364/156 |
| 4,700,318 | 10/1987 | Ockman | 364/518 |
| 4,764,867 | 8/1988 | Hess | 364/200 |
| 4,782,463 | 11/1988 | Sanders et al. | 364/521 X |

OTHER PUBLICATIONS

*Microsoft Works Reference*, 1987, pp. 179-236.
Schmidtberg & Yerry, "Designing Complex Assemblies Using the Top-Down Approach," *Autofact 1986 Proceedings*, pp. 9-31 to 9-43.
Sathi et al., "Callisto: An Intelligent Project Management System," *The AI Magazine*, vol.-No. Winter (1985) pp. 34-50.

Primary Examiner—Heather R. Herndon
Attorney, Agent, or Firm—Michael J. Femal; Richard C. Auchterlonie

[57] ABSTRACT

A data display, preferably having screens or windows, is built from data in a data base according to a hierarchy of display knowledge. Therefore, the data values themselves are separate from the knowledge or rules that specify how the data values are displayed to a user. In particular, the display knowledge is arranged in a hierarchy so that an individual item of display knowledge may be applicable to a wide range of data values representing the attributes of a number of different objects. In many cases, the range of data values or the attributes which the data values represent can be changed without any need to change the display knowledge. In other cases, only minor changes to the display knowledge are needed to properly display values for new or different data. These minor changes, for example, need only be made by changing the lowest level in the hierarchy of the display knowledge or associating items of display knowledge in the lowest level with different display knowledge in the higher levels. In a preferred embodiment, the highest level of the hierarchy of display knowledge defines individual display screens, and the lowest level defines fields of successive character locations on the display screens. The individual display screens are defined by a particular sequence of fields and the data values to be displayed or associated with the fields.

24 Claims, 9 Drawing Sheets

FLEXIBLE DATA DISPLAY

BACKGROUND OF THE INVENTION

1. Technical Field

The present invention relates generally to data display terminals for data processing systems, and more particularly to software utilities for interfacing an application program to a data display terminal. Specifically, the present invention concerns a method and system for building display screens and receiving user data entered into the display screens in such a way that the content and format of the display screens is readily adapted to a specific application or modified during the design, development and maintenance of the application program.

2. Background Art

Data display terminals are well known in the data processing field. In general, a data display terminal includes a keyboard for receiving alphanumeric data from a user, a display device such as a cathode ray tube or matrix of display elements such as electroluminescent or liquid crystal junctions, and an image buffer for storing a page of data to be displaced on the display device. Typically, the image buffer is an addressable memory having respective storage locations corresponding to predefined pixel or character positions on the screen of the display device. Each storage location, for example, holds a binary code for the alphanumeric or graphic character to be displayed at the respective position, and display attributes defining the manner in which the character is to be displayed. The display attributes typically control the intensity or color of the character and permit the character to be selectively underlined, blinked, or displayed in a "reversed field" fashion in which the intensity or color of the background of the screen is interchanged with the intensity or specified for the character in the image buffer.

In some cases the image buffer is a contiguous set of storage locations allocated as a portion of the main random access memory for a central processor in a data processing system. In this case the programmer can write machine language instructions which directly specify the characters to be displayed and their respective positions on the display screen by writing character and attribute codes directly to the respective addresses of the image buffer. Alternatively, the image buffer is connected to the central processor via an input-output port, and the character and attribute codes along with specified respective image buffer addresses are transmitted through the input-output port.

A number of software utilities are commercially available for assisting the programmer in addressing the image buffer and specifying the desired character and attribute codes. To display a character string in a "field" beginning at a selected position on the display screen, for example, a subroutine in the utility is called. The character string and the selected position on the display screen are passed as parameters to the subroutine. The parameters include, for example, a literal or string variable representing the character string, and a pair of constants or numeric variables specifying the row and column coordinates of the selected position. When a variable is to be used as a parameter, the datatype or length of the variable is also specified.

When the data terminal is used for input of data, a character being entered on the keyboard is typically displayed at an indicated position on the display screen. That position is indicated by a special symbol or change in the display attributes, known as a "cursor". The software utility for the display terminal has a data input function which activates the cursor at the current cursor position. When an alphanumeric character is entered at the keyboard, the character is written to the current cursor position of the image buffer, causing the character to be displayed in lieu of the cursor. The character may then be used as input data. Additional characters are entered by advancing the cursor position and repeating the process.

For many applications, it is desirable to display an entire screen of data, and then have the user enter data in selected fields on the display. The fields are assigned different access types such as "output only" or "input-output". The fields are defined, for example, by a different subroutine call for each of the access types. When an "input-output" field is defined, the boundaries of the field are stored in memory. The data input function initially places the cursor at the first character position in the first "input-output" field. As characters are entered from the keyboard, the cursor is advanced to a position that falls within an "input-output" field on the display screen. Therefore, the "output only" fields and unassigned locations of the display screen are "protected" from being changed by the user.

The data entry process typically continues until the user enters a control character, for example, by activating an "enter" key on the keyboard. At this time the data input function scans the buffer image of each of the "input-output" fields in an attempt to convert the character codes in the images of the fields to data values consistent with the data types of the variables associated with the fields. If the conversion is unsuccessful, an error message is displayed to the user, the cursor is placed in the field containing the error and the data entry process is repeated.

Data-base applications have used the above-described data display and entry process. In this case a set of screens are programmed for each of the record formats of the files in the data base. As noted above, this has required a subroutine call including the screen coordinates of each field in each screen. In many cases, the programming has been rather laborious. When a record format of the data base is changed, subroutine calls for certain fields must be added or deleted, and in many cases the screen coordinates of other fields must be changed to accommodate fields that have been added or deleted.

SUMMARY OF THE INVENTION

The primary objective of the present invention is to provide a method and system for building display screens and receiving user data entered into display screens in such a way that the content and format of the display screens is readily adapted to a specific application or modified during the design, development and maintenance of the application program.

A specific object of the present invention is to eliminate the need for the programmer to specify screen coordinates when laying out or modifying the placement of fields on display screens when designing or maintaining an application system using a series of display screens for user input and output.

Another object of the present invention is to provide a method and system for displaying and editing screens of data from a database wherein the format of the database itself governs how the data is displayed on the screens.

Briefly, in accordance with the present invention, a data display, preferably having screens or windows, is built from data in a data base according to a hierarchy of display knowledge. Therefore, the data values themselves are separate from the knowledge or rules that specify how the data values are displayed to a user. In particular, the display knowledge is arranged in a hierarchy so that an individual item of display knowledge may be applicable to a wide range of data values representing the attributes of a number of different objects. In many cases, the range of data values or the attributes which the data values represent can be changed without any need to change the display knowledge In other cases, only minor changes to the display knowledge are needed to properly display values for new or different data. These minor changes, for example, need only be made by changing the lowest level in the hierarchy of the display knowledge or associating items of display knowledge in the lowest level with different display knowledge in the higher levels.

In a preferred embodiment, the highest level of the hierarchy of display knowledge defines individual display screens, and the lowest level defines fields of successive character locations on the display screens. The individual display screens are defined by a particular sequence of fields and the data values to be displayed or associated with the fields.

Each field, for example, is identified by a field name and defined by a field record holding the length of the field and flags indicating whether the field has respective attributes. The flags include a flag (D) indicating whether the field is to be included in the display, a flag (R) indicating whether the user is required to enter data into the field, a flag (U) indicating whether data in the field can be updated, a flag (N) indicating whether the field is associated with new data, and a flag (S) indicating whether a data processing operation is to be performed with respect to the field after the field is accessed during a display operation.

BRIEF DESCRIPTION OF THE DRAWINGS

Other objects and advantages of the invention will become apparent upon reading the following detailed description and upon reference to the drawings in which.

Figure 1:
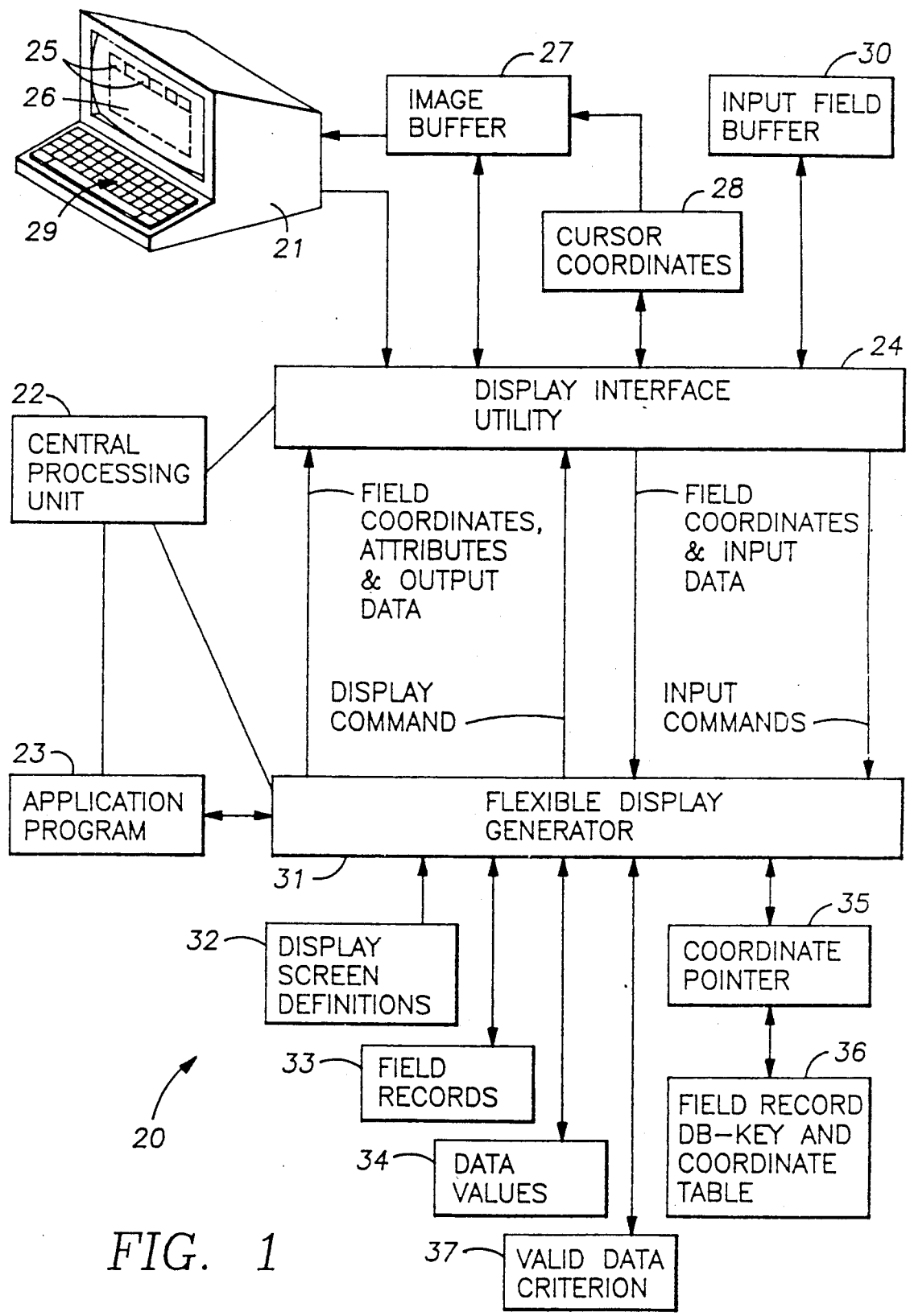
FIG. 1 is a block diagram of a data processing system incorporating the present invention for building display screens on a data terminal.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings, there is shown in FIG. 1 a block diagram of a data processing system generally designated 20 which is interfaced to a user (not shown) via a data display terminal 21. As is conventional, the data processing system 20 includes a central processing unit 22 and a memory system which is subdivided into the other components shown in FIG. 1. The memory, for example, holds an application program 23 that is executable by the central processing unit to use the data display terminal 21 for a specific application. Another portion of the memory holds a display interface utility 24 which is executable by the central processing unit 22 to cause specified alphanumeric or graphic symbols to be displayed in specified fields 25 on a display screen 26 of the data display terminal 21.

As is conventional, the display interface utility 24 includes means for receiving the coordinates and attributes of a specified field along with alphanumeric character codes and for displaying corresponding characters in a specified field on the display screen 26. For this purpose, the display interface utility 24 loads the alphanumeric character codes and corresponding display attributes in an image buffer 27. When the display terminal 21 is in an active display mode, whatever is in the image buffer 27 generates a corresponding image on the display screen 26. In particular, the image buffer 27 includes an addressable storage location for each character position on the screen 26. Therefore, when the display interface utility 24 receives a new set of field coordinates and a new set of alphanumeric character codes for a new field, the alphanumeric character codes are stored in a series of contiguous storage locations in the image buffer beginning at a storage location having an address corresponding to the field coordinates.

As is convention, the display interface 24 can selectively activate the display terminal 21 to display a special character or change the attributes of a character on the display screen 26 in order to indicate a cursor at a selected cursor position The cursor coordinates are stored in a memory location 28. When the cursor is activated, the user is able to change the position of the cursor on the display screen 26 by activating selected cursor control keys on an alphanumeric key board 29 included in the data display terminal 21. Cursor control characters such as arrows that point up or down and right to left, the "tab" key and the "line feed" key, change the position of the cursor without otherwise modifying the data displayed on the screen 26. When an alphanumeric character key is activated, however, the symbol associated with that key is displayed on the display screen 26 at cursor position, and the cursor is then advanced.

As will be further described below, it is advantageous to operate the data display terminal 21 by first building a particular display of alphanumeric characters on the display screen 26, permitting the user to enter data or edit selected fields on the display screen, and then causing the application program 23 to process the data having been entered or edited by the user. In this case, the cursor is constrained to lie within fields that are defined to be "updatable" After the data terminal 21 is initialized, for example, unassigned areas of the display screen 26 as well as fields that are defined to be "output only" fields are protected from data entry or editing. Information about the positions of the updatable fields is stored in an input field buffer 30. Therefore, when the cursor is to be advanced in response to the entry to a character, the cursor is advanced to the next available position indicated by the input field buffer 30.

When the user is finished entering or editing data in the updatable fields, the user activates an "enter" key or a "function" key to cause the application program 23 to process the data having been entered or edited. In response, the display interface utility 24 preferably returns the field coordinates and data associated with only those updatable fields within which the user has entered or edited data. For this purpose, the input field buffer 30 stores a copy of the data having been originally displayed in each input field. The display interface utility compares the contents of the input field buffer for each input field to the contents at the corresponding location of the image buffer 27 to determine which of the input fields have been modified. The display interface utility 24 can thereby determine the coordinates of the modified input fields and obtain the modified data associated with those fields from the image buffer 27.

A display interface utility 24 operating in the above described fashion can be implemented in a number of ways. A particularly advantageous way is for the display interface utility 24 to be built into the display terminal 21 so that the central processing unit 22 can perform other tasks when the user is entering and modifying data displayed by the display terminal 21. It should be readily apparent that a conventional personal-type microcomputer could be programmed to operate in such a fashion. Alternatively, the display interface utility 24 is a set of subroutines that are linked with the application program 23, loaded and executed by the central processing unit 22.

As will be further described below, a particularly troublesome problem with using such a conventional display interface utility is that the coordinates of each defined field must be provided to the display interface utility. A typical application program 23, however, may require a large number of display screen to be built and edited. This has been done, for example, by writing a subroutine call to the display interface utility for each of the fields to be defined on the display screen. In a data base management system, for example, a set of screens are programmed for each of the record formats of the files in the data base. If the data base includes a large number of record formats, however, the programming is rather laborious. Moreover, when a record format of the data base is changed, subroutines for certain fields must be added or deleted, and in many cases the screen coordinates of other fields must be changed to accommodate fields that have been added or deleted.

In accordance with an important aspect of the present invention, the data processing system 20 includes a flexible display generator 30 which determines the field coordinates as the screen is built by interpreting records of a data base which is preferably organized in a hierarchical fashion. The data base, for example, includes display screen definitions 32 which define each of the display screens to be used by the application program 23. Each display screen includes a predefined set of fields, and the fields are defined by respective field records 33. Each display screen is also defined by respective data values 34 that are linked to the field records.

While the flexible display generator 30 is building a display screen, it uses a coordinate pointer 35 to keep track of the coordinates assigned to the field record currently being interpreted as the display is built. In order to associate the fields including data entered or edited by the user, the flexible display generator 30 accesses a table 36 associating the field records for at least the updatable fields with their respective coordinates on the display screen 26. Therefore, when the user has entered or edited data in an updatable field, the coordinate table 36 can be accessed to find a pointer or data base key to the field record of the field having been modified. Since this field record is linked to a respective data value, the new data value having been entered by the user is transferred from the display interface utility 24 to the respective data value store 34.

After all of the newly entered or edited data values have been transferred from the display interface utility 24 to the data value store 33, the flexible display generator 30 performs an initial validity check on the new data values. For this purpose, valid data criterion 37 are defined at least for the data values associated with some of the updatable fields When the flexible display generator 30 finds a data value that does not satisfy its respective valid data criterion, an error message is displayed on the display screen 26 informing the user that invalid data has been entered. Also, fields defined to be "required data" fields are considered to have invalid data if data is not entered by the user. The coordinates of the field including the invalid data are determined and transmitted to the display interface utility 24 along with a display command to position the cursor at those coordinates. Then a display command is transmitted to the display interface utility to repeat the data entry process starting with the field including the invalid data.

The objective and operation of the system shown in FIG. 1 will become more clear when it is considered in connection with a specific application program. The system of FIG. 1, however, can be used with a wide range of application programs which operate in a similar fashion as illustrated by the generic flowchart generally designated 40 and shown in FIG. 2.

Figure 2:
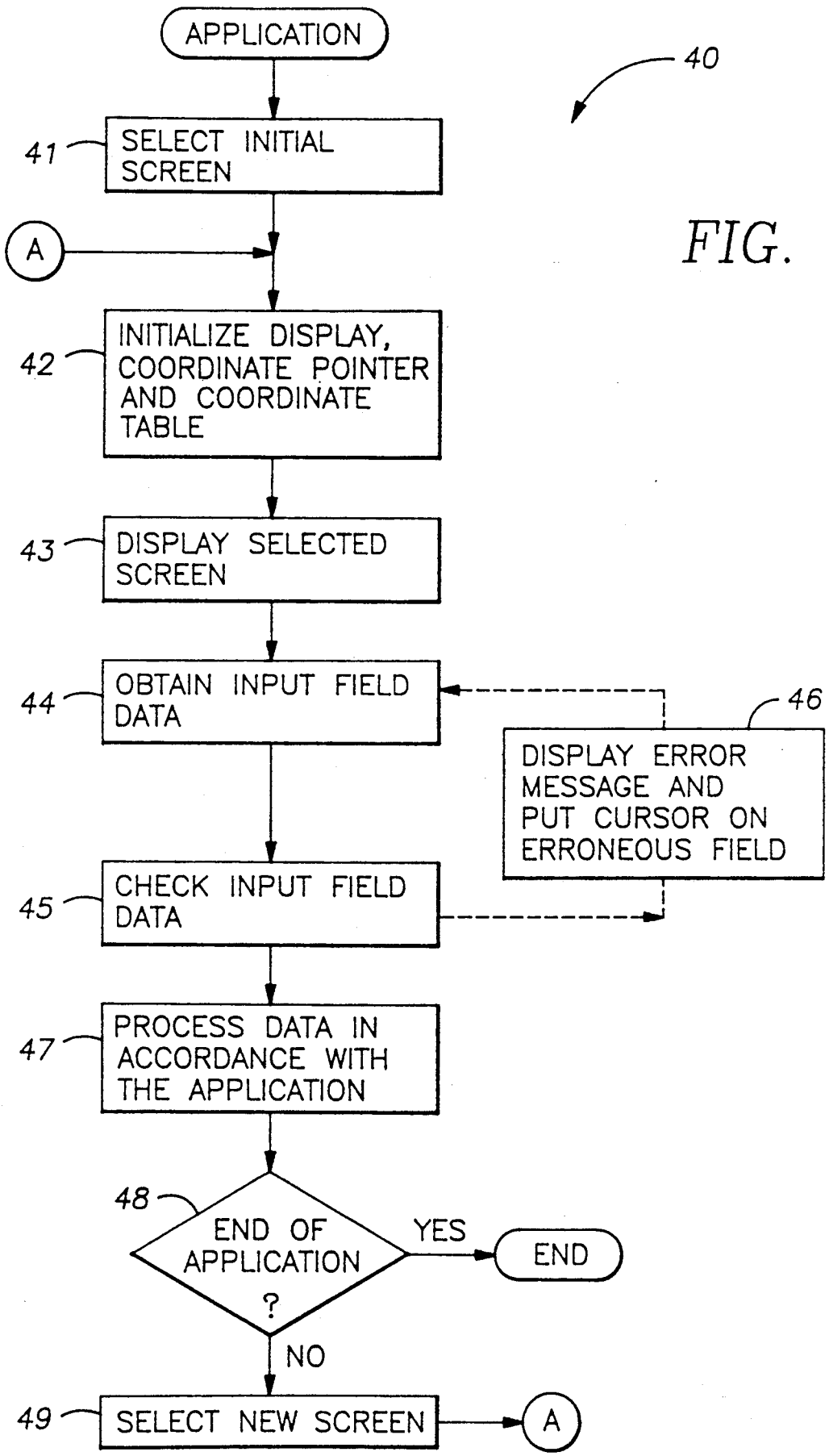
FIG. 2 is a generalized flowchart of an application program incorporated into the system of FIG. 1.

Turning now to FIG. 2, in the first step 41 of the application, an initial screen is selected. The display is initialized, for example, by transmitting a display command to the display interface utility 24 that clears the image buffer and sets the cursor coordinates to the upper left or "home" position In a similar fashion, the coordinate pointer (34 in FIG. 1) is set to an initial value pointing to the "home" position and the coordinate table 35 is initialized. The coordinate table, for example, includes a storage location for a key and a flag for each possible character position on the display screen 26.

In step 43 the selected screen is displayed. As will be further described below, this step is performed by passing a data base key to a subroutine in the flexible display generator 30. This data base key points to a record in the data base holding a definition of the selected screen.

After the screen is displayed, in step 44 the application program calls another subroutine in the flexible display generator 33 to obtain any data having been entered or edited by the user, and to transfer that data to respective data value storage locations (33 in FIG. 1). Then, in step 45 still another subroutine in the flexible display generator is called to check the input field data. In addition to the data having been entered or edited by the user, the flexible display generator also checks to ensure that the user has entered data in preassigned "required" fields. Such fields are indicated to the user by the display of an under-bar character for each character position in the field.

If the user makes an incorrect data entry or change or fails to enter valid data in any required data field, an error flag is returned from the subroutine call performed in step 45. In response to such an error flag, the application program 23 may request the user to make another attempt at data entry. In step 46, for example, the application program displays an error message and commands the display interface utility 24 to position the cursor on the erroneous field. The position of the erroneous field is provided by the coordinate pointer (44 in FIG. 1).

It should be noted that the checking of input field data performed in step 45 by the flexible display generator is a rather elementary data check. The data check is performed, for example, by comparing the data value provided by the user to legal values such as a data type or a set or range of legal values. In step 47 this data are further checked and processed in accordance with the specific application. Depending upon the state of the data processing after step 47, the application is terminated as determined in step 48 or a new screen is selected in step 49. When a new screen is selected, the application returns to step 42 to begin the process of displaying that new screen.

The present invention is especially useful for applications in which a large number of different screens must be selected or in which the format of the screen must be varied in accordance with the specific data to be displayed. In these cases it is very difficult for the programmer to explicitly specify the coordinates of each field for each possible screen format. A specific application where this occurs is the selection of equipment or components to be assembled. In this case, the user must ultimately be presented with a series of display screens including all of the components to be included in the assembly. If the user is permitted to select a large number of possible configurations for the assembly, then there will be a large number of possible screen formats.

Figure 3:
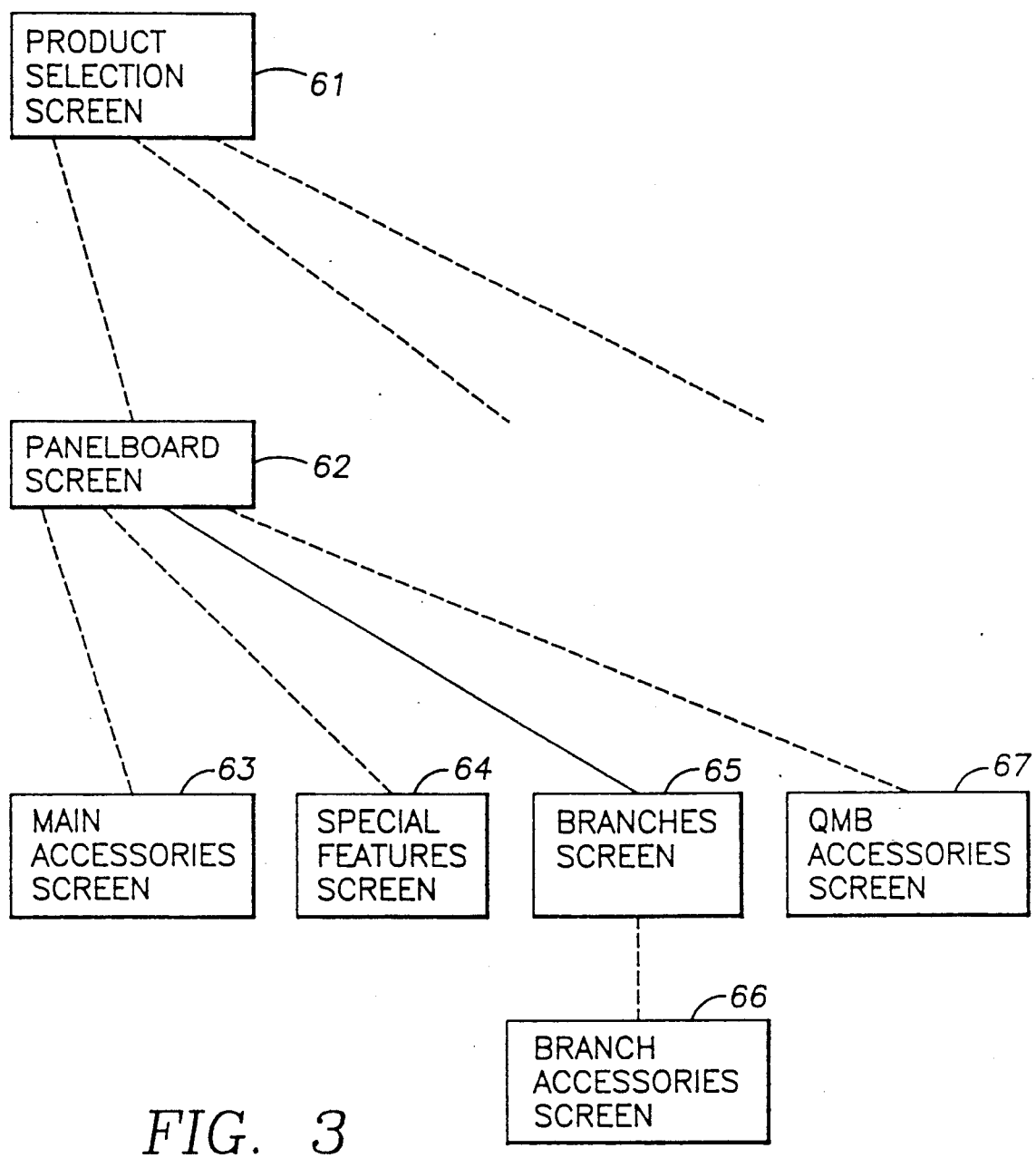
FIG. 3 is a schematic diagram illustrating a series of related display screens that can be built using the system of FIG. 1.

Turning now to FIG. 3 there is shown a diagram illustrating a set of screens for an equipment selection system that permits the user to select assemblies of electrical components. Prior to the design of such a selection system, the user had to consult printed forms listing instructions and options for selecting the equipment for various assemblies. Shown in Appendix I, for example, are instructions and options that were used for selecting panelboards. As is well known in the electrical equipment field, a panelboard is used in an electrical distribution system, for example, at a point where a power line enters a building. Inside the building are a number of branch circuits which are typically connected to the main line through circuit breakers mounted on the panelboard.

The first step in designing such an equipment selection system is to define a series or hierarchy of generic screens corresponding to the printed instructions and options that were previously used for equipment selection. The screens are conveniently arranged in a hierarchy to indicate the screens that are first presented to the user because they present choices that affect the format of the other screens to be presented. As shown in FIG. 3, for example, a product selection screen 61 permits the user to choose a particular product or assembly to be further specified. A specific example of such a product selection screen is shown in Appendix II. In the product selection screen, for example, the user can select "PANELBOARD".

When "PANELBOARD" is selected, a panelboard screen 62 is displayed. In this screen the user is required to specify certain essential parameters such as voltage, main type, amperage and the quantity, amperage and number of poles for the branch breakers The specific components to be assembled on the panelboard are dependent on these required parameters. Other parameters affecting the selection of components have default values which can be changed by the user. These further selections are made by editing a "main accessory" screen 63, a "special features" screen 64, a "branches" screen 65, a "branch accessories" screen 66, or a "QMB accessories" screen 67. The general format of these screens is shown in Appendices IV-VIII. Except for the "branches" screen 65, these other screens are presented to the user only when the user requests special features or accessories.

Although the general format of the display screens 63-66 has been shown in Appendicies IV-IIX, the specific screen format is dependent upon the specific configuration of equipment that is selected by the user to form the panelboard. Therefore, there is a very large number of possible screen formats. To ensure that each of the possible screen formats will be acceptable to the user, it is necessary for the programmer to know what each of the possible screen formats will look like after the system is designed or changed to reflect changes in the electrical components currently available to the user. Due to the large number of possible screen formats, it is impractical for the programmer to explicitly program the coordinates of each field on each possible screen. A conventional display interface utility as described above in connection with FIG. 1, however, references the individual fields by their respective field coordinates.

Figure 4:
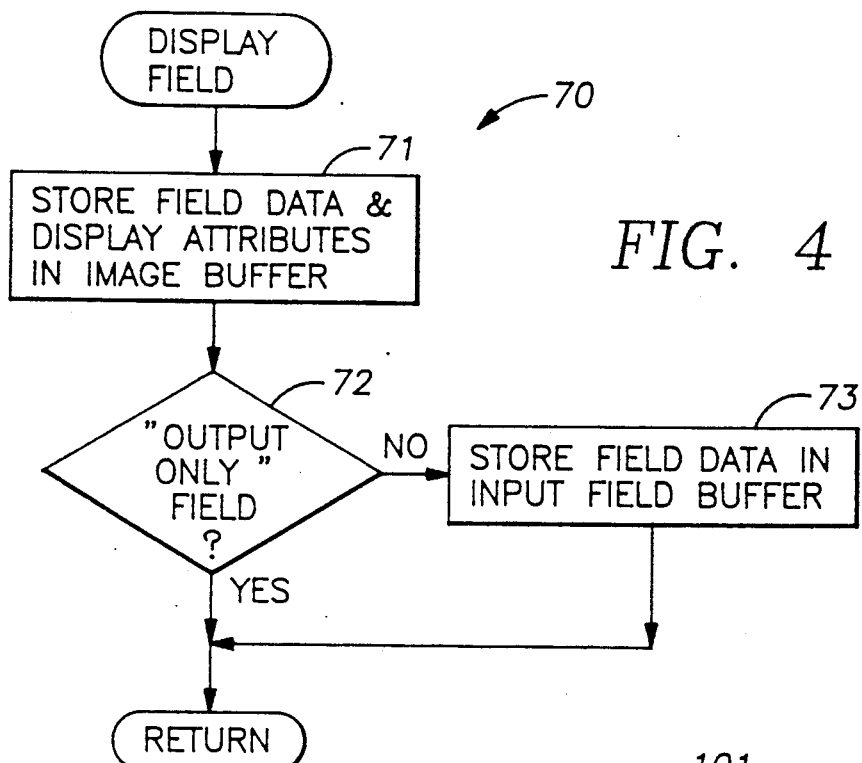
FIG. 4 is a flowchart illustrating the method by which the display interface utility in the system of FIG. 1 displays a field of data on the display screen of the data terminal.

Turning now to FIG. 4, there is shown a flowchart generally designated 70 which illustrates the method by which the display interface utility (24 in FIG. 1) displays a field beginning at specified display coordinates. In the first step 71 the alphanumeric characters to be displayed in the field and any display attributes for the field are stored in the image buffer (27 in FIG. 1) beginning at an address corresponding to the specified display coordinates. For the screens shown in Appendix II-IIX, for example, the possible character positions on the screen form a matrix having 80 columns and 24 rows. The coordinates of that particular character position can therefore be represented by a single number ranging from 0 to 1839. This single number can therefore be used to address the image buffer to store the first character for the field and its attributes, and the other characters for the field are stored at successive storage locations in the image buffer.

If the field is defined as an "output only" field, as determined in step 72, the procedure of FIG. 4 is completed. Otherwise in step 73, the field data is stored in the input field buffer (30 in FIG. 1) which is similar to the image buffer (27 in FIG. 1). This is done so that during a screen data input procedure, the field data for each of the fields stored in the input field buffer can be compared to the corresponding data in the image buffer 27 in order to determine which of these fields have data that has been changed by the user.

Figure 5:
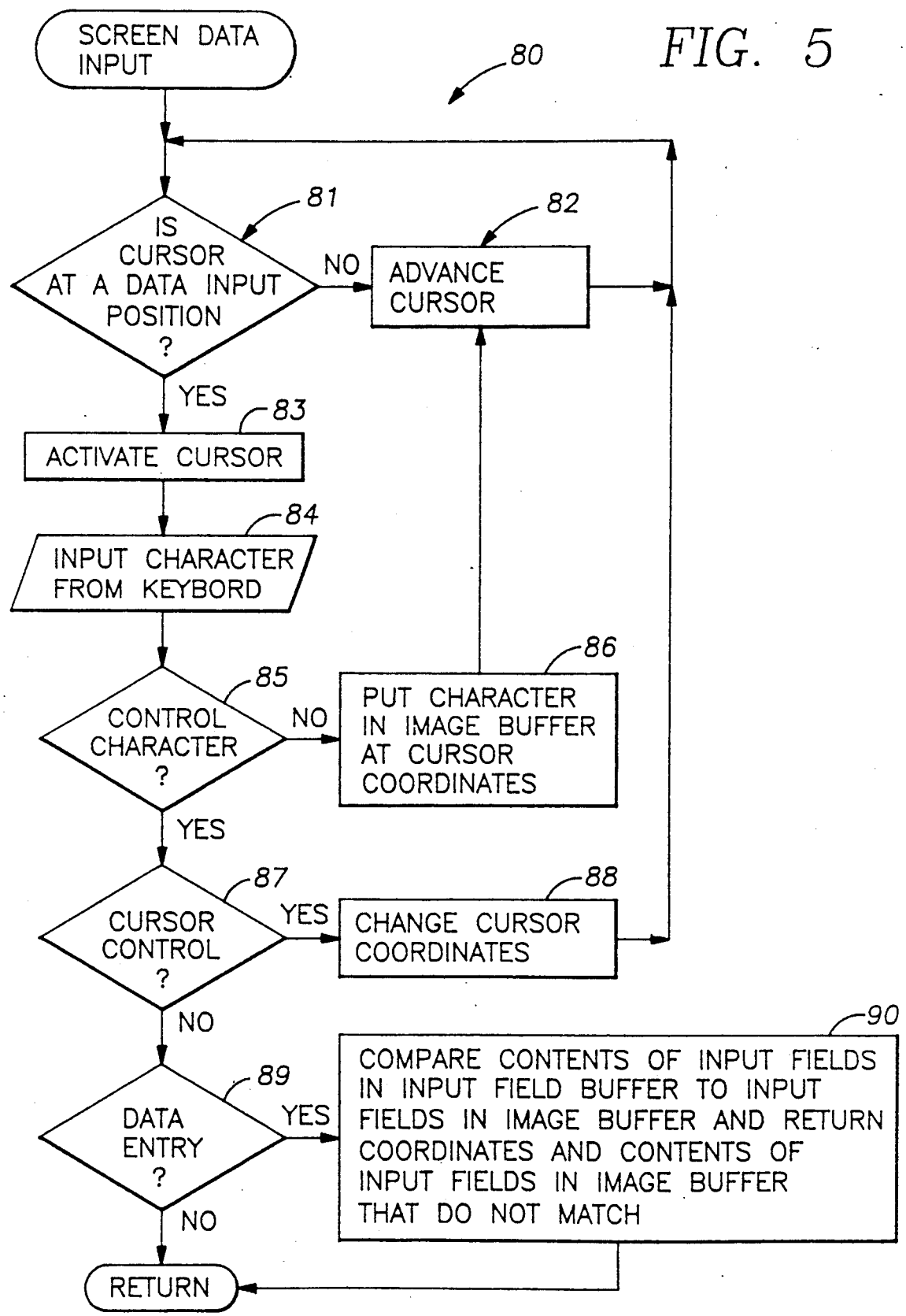
FIG. 5 is a flowchart illustrating the method by which the display interface utility in FIG. 1 receives data from a user after the user edits a screen of data.

Turning now to FIG. 5 there is shown a flowchart generally designated 80 which illustrates the procedure which is used by the display interface utility (24 in FIG. 1) to permit the user to change the data in the updatable fields and to send that data to the application program (23 in FIG. 1). The background of the display and the "output only" fields, however, are protected from the user entry of data. For this purpose, the cursor is permitted to be positioned only in the fields defined in the input field buffer 30. Specifically, in the first step 81, the display interface utility checks whether the cursor is initially at a data input position defined in the input field buffer. The input field buffer 30, for example, includes for each possible screen position a flag indicating whether that position is defined to reside in an updatable field. If the cursor is not at a data input position, then in step 82 the cursor is advanced to the next position on the display screen, and execution returns to step 81. It should be apparent, therefore, that the screen data input procedure of FIG. 5 is used only when at least one updatable field has been defined on the display screen. Therefore, steps 81 and 82 are performed until the cursor resides at a data input position.

Once the cursor resides at a data input position, in step 83 the cursor is activated to tell the user that data may be entered at the cursor position. In step 84 a character entered by the user is received from the key board (29 in FIG. 1). If this character is not a control character, as detected in step 85, then in step 86 the code for that character is placed in the image buffer at a storage location corresponding to the cursor coordinate, and then step 82 is performed to advance the cursor. Otherwise, in step 87 the display interface utility checks whether the character is a "cursor control" character that is entered by the user to change the position of the cursor. If so, then in step 88 the cursor coordinates are changed in accordance with the cursor control character and execution jumps back to step 81. Otherwise, in step 89 the display interface utility checks whether the control character signifies that the data entered by the user should be transmitted to the application program. Such a data entry character is entered when the user activates the "enter" key or a predefined "function" key on the key board.

If the display interface utility does not recognize the control character as a data entry character, then execution returns to pass this control character to the application program 23. Otherwise, in step 90 the display interface utility compares the contents of each of the input fields defined in the input field buffer (30 in FIG. 1) to the corresponding contents in the image buffer 27, and for each case in which the contents do not match, the contents of the entire input field are transferred from the image buffer 27 to the application program 23. Also, the display interface utility 24 passes the field coordinates associated with the input data from a field having been changed by the user. These field coordinates are obtained, for example, by looking in the input field buffer for a flag indicating the start of each updatable field. By inspecting the field coordinates returned by the display interface utility 24, the application program can identify the data having been changed by the user.

Each field, for example, corresponds to a particular variable defined in the application program 23, and the application program can consult the coordinate table 36 to obtain the variable name or address of the variable corresponding to the field coordinates. When the display interface utility 24 shares the same central processing unit 22 as the application program 23, the coordinate table is typically accessed by the display interface utility. In other words, the display interface utility 24 may use the actual variable names or addresses as subroutine parameters when the fields are defined and when data is entered by the user and returned to the application program. When a field is displayed by a subroutine call to the display interface utility 24 including the field coordinates and a variable defining the alphanumeric characters to be displayed, display interface utility 24 will store the variable name or address in a coordinate table, and conversely when the data is received by the user, this data is entered directly into memory by referencing the coordinate table to determine the variable name or address of which the data is to be stored in memory. A specific example of such a display interface utility is the TELON facility distributed on Pansophic Corporation, 709 Enterprise Drive, Oak Brook, Ill. 60521.

It should be now appreciated that a major shortcoming of the conventional display interface utilities 24 is that the display fields are defined in terms of their respective display coordinates. For applications in which there are a large number of possible display formats in which the fields have different coordinates, it is very laborious to explicitly program the coordinates for each field for each possible display format. Therefore, in accordance with a major aspect of the present invention, the flexible display generator (31 in FIG. 1) automatically determines these coordinates by interpreting records in a data base so that the screen format itself is determined by the organization of the data base. This is especially advantageous when the data base has a hierarchical organization. This hierarchical organization can therefore reflect the hierarchy of the general screens, as illustrated by the hierarchical organization in FIG. 3, or when the screens successively display the data at various levels of a hierarchical data base.

In the product selection system, for example, both considerations hold because the product to be selected consists of assemblies and subassemblies. This is reflected by the general formats for the screens 63-66 in FIG. 3 as shown in Appendicies IV-VIII. In these cases a major part of the display consists of a series of fields for each piece of equipment to be assembled in the panelboard. Therefore, the information required for generating each of these display screens is itself hierarchical in nature, including at an uppermost level the equipment to be included in the panelboard, at a middle level the fields to be displayed for each piece of equipment, and at a lower level the characteristics of each of the display fields. Also, each of the display fields is linked to a respective data storage location specifying the respective alphanumeric characters to be displayed.

Figure 6:
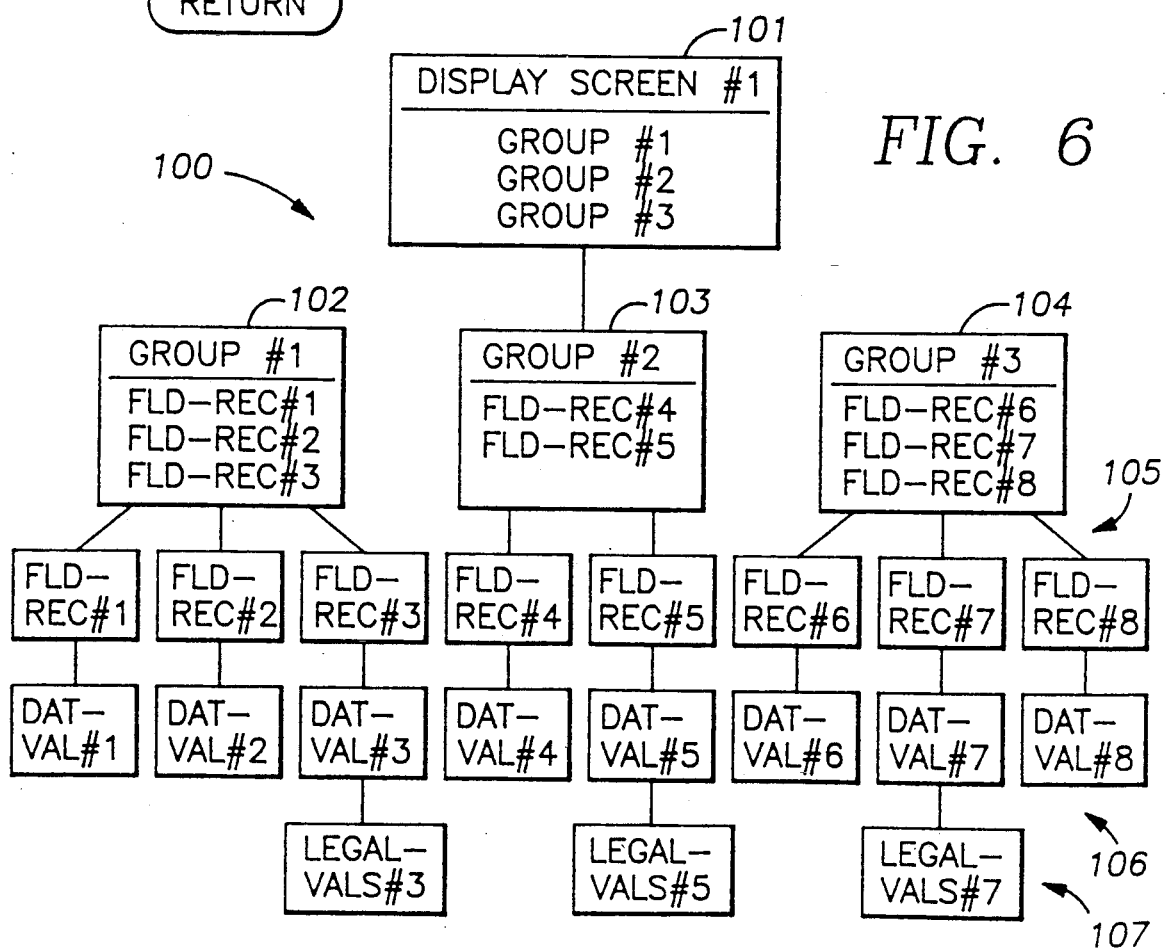
FIG. 6 is a schematic diagram illustrating a preferred hierarchy of display knowledge used by the system of FIG. 1 for building and editing a display screen.

Turning now to FIG. 6., there is shown this hierarchy of display information generally designated 100. The information 101 defining a display screen (screen #1) includes a list of three groups of records (group #1-- group #3). Each group corresponds to a different component or piece of equipment. Each group is in turn defined by a list 102, 103, 104 of field records. The field records generally designated 105 define the individual fields in the display screen (screen #1). Linked to the field records are respective storage locations storing data values generally designated 106. At least some of the updatable field records are linked to definitions of legal values 107.

In order to build the display screen (screen #1), the flexible display generator (31 in FIG. 1) reads the screen definition 101 to obtain the list of group. For each group in that list, the display generator reads the respective group definition 102, 103, 104. When reading each group definition, the flexible display generator reads each field record. For those field records which define data to be displayed, the corresponding data value 106 is obtained and transmitted to the display interface utility (24 in FIG. 1) to display that value. During that process the flexible display generator updates a coordinate pointer (35) that provides the display coordinates for each field to be displayed.

Figure 7:
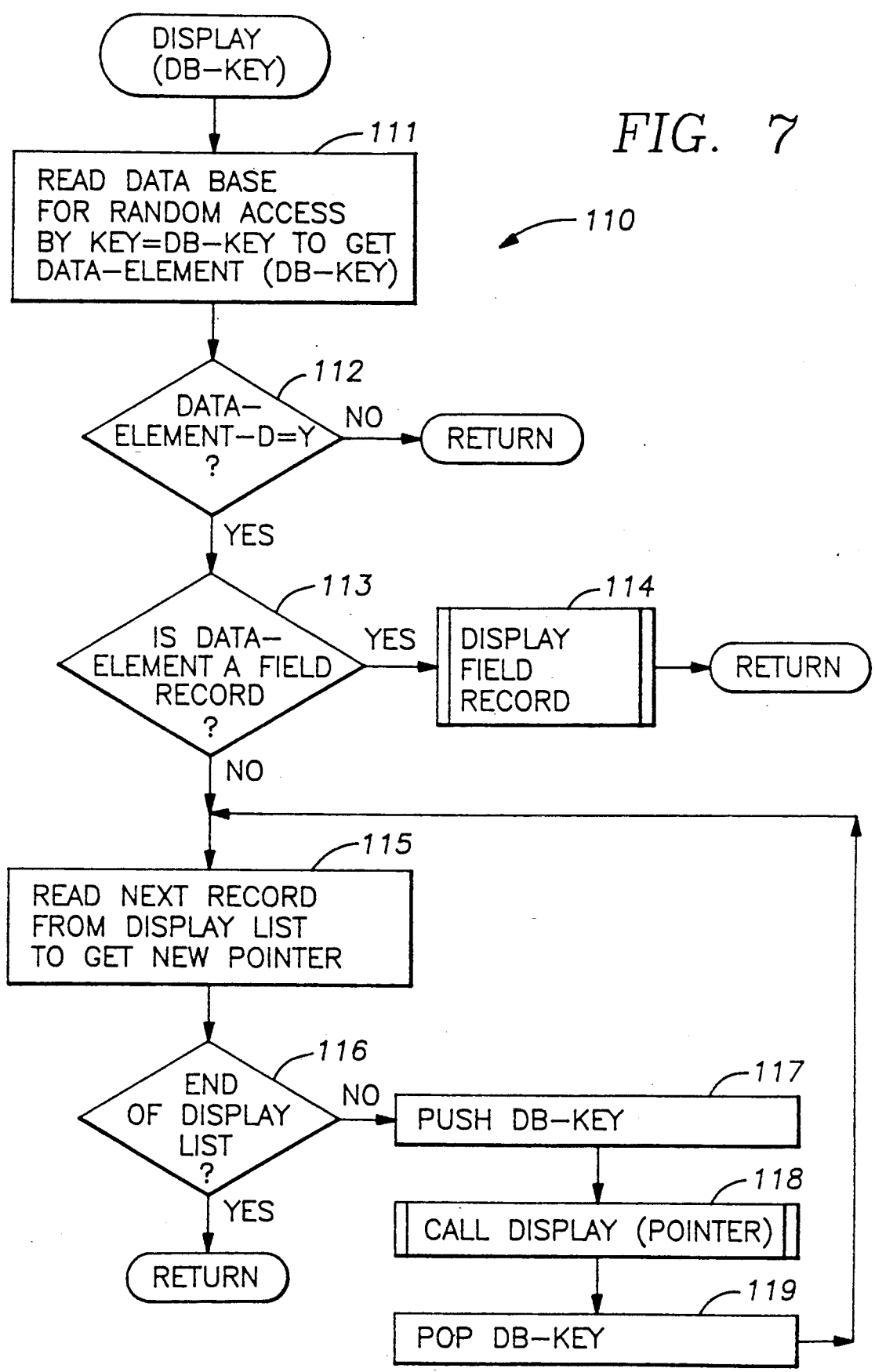
FIG. 7 is a flowchart illustrating the method by which a flexible display generator in the system of FIG. 1 builds a display screen by reading a hierarchical data base including display knowledge.

Turning now to FIG. 7 there is shown a flowchart of a recursive procedure 110 that is employed by the flexible display generator 31 for interpreting a hierarchy of display knowledge such as the hierarchy 100 in FIG. 6. By employing a recursive procedure, the flexible display generator can interpret a hierarchy having any number of levels. The screen to be displayed is specified by a data base key (DB-KEY) that is initially provided by the application program. In this regard it is assumed that the hierarchy of display knowledge is stored in a key-indexed file. The actual indexing and organization of records in the file can be provided by a standard data base utility such as IDMS distributed by Cullinet, 400 Blue Hill Road, Westwood, Mass. 02090-2198.

In the first step 111, the data base is read for random access by the specified key (DB-KEY) to obtain the data element or record pointed to by the key. It is assumed that the data element has a display flag (D) to indicate whether the display knowledge specified by that record is to be used. If the flag D is not set, then execution returns. Otherwise, in step 113, the flexible display generator determines whether the data element is a field record. If so, then in step 114 the field record is displayed, and execution returns.

If the data element is not a field record, then it is a list of pointers or keys to other data elements Each pointer in the list, for example, resides in a data base record. Therefore, in step 115, the next pointer is obtained from the display list by sequential access of the data base. In step 116, execution returns if the end of the list is reached. Otherwise, in step 117 the current value of the data base key, which indicates the current position in the display list, is saved by pushing it onto a stack. Then, in step 118, the display subroutine 110 is recursively called to access the data element pointed to by the pointer read from the display list in step 115. The data base key was saved in step 117 because the recursive call in step 118 uses the pointer as the data base key to access the data base. Upon returning from the subroutine call in step 118, the saved value of the data base key is popped from the stack in step 119 in order to read the next record from the display list in step 115.

Figure 8:
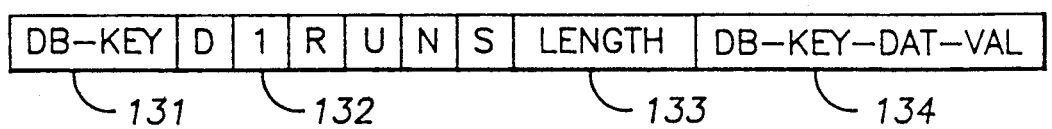
FIG. 8 is a diagram illustrating the format of a field record encoding the display knowledge for a single field on the display screen.

Turning now to FIG. 8 there is shown a specific format generally designated 130 for the field records. The record is indexed according to its data base key. Next, the record includes the display flag (D) that was used in step 112 of FIG. 7. Following the display flag is a flag 132 that is set to distinguish the display record from the display records including lists. This flag 132 in effect permits the display routine of FIG. 7 to determine the depth of the hierarchy of display information. If the hierarchy has a fixed depth, such as three levels as shown in FIG. 6, such a flag is not needed in order for step 113 in FIG. 7 to known when the data element is a field record, since the field record will always reside at the third level of hierarchy.

The display record includes four other flags including a flag "R" indicating whether the user is required to enter data into the respective field, a flag "U" indicating whether the user is permitted to enter data into the respective field, a flag "N" that is set when the field is displayed, and a flag "S" which is set when the user enters data or edits the respective field. The field record further includes a number 133 indicating the length in characters of the respective field. Finally, the display record is associated with a data base key 134 for a respective data value to be displayed in the field. This data value is also used to store the data having been entered or edited by the user into the respective field. Specific examples of field record data for the equipment selection system are shown in Appendicies IX-XI.

Figure 9:
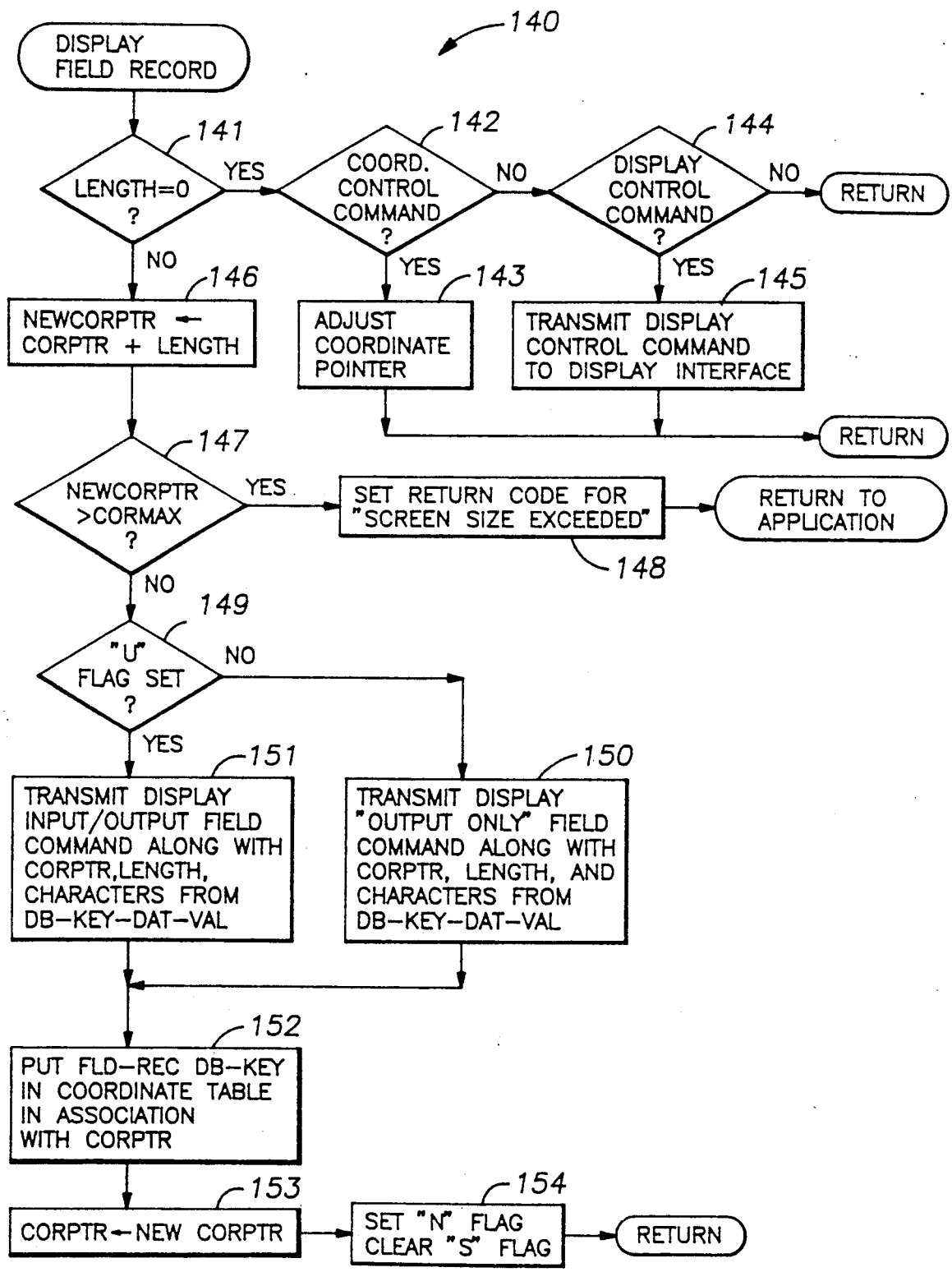
FIG. 9 is a flowchart of the procedure by which the flexible display generator of FIG. 1 interprets a field record in the format of FIG. 8.

Turning now to FIG. 9, there is shown a flowchart generally designated 140 of the procedure used by the flexible display generator to interpret the display record format of FIG. 8 and display the respective data value linked to the field record. In the process the flexible display generator updates the coordinate pointer in order to determine the coordinates for the fields as they are displayed. In general, the coordinate pointer is advanced by the length or number of characters displayed in each display field. It is sometimes desirable, however, to permit the display record to adjust the coordinate pointer in certain ways or to change the display attributes. For this purpose it is possible to have the field record include a command for controlling the coordinate pointer 35 or for controlling the display terminal. This can be done, for example, in step 141 by comparing the value of the length to zero, and when the length is equal to zero, interpreting a control command that is stored in the field record in lieu of the data base key to the data value. The coordinate control command could, for example, set the coordinate pointer to a predefined value, or to provide a carriage return, line feed, or tab function. Therefore, if the control command is recognized in step 142 as a coordinate control command, the coordinate pointer is adjusted accordingly in step 143. It is also desirable to permit the field record to change the attributes of the display. For this purpose in step 144 the control command may be recognized as a display control command and in this case, in step 145 the display control command is transmitted to the display interface utility 24.

In the usual case, the field record specifies a certain number of characters to be displayed. Therefore, if the length is not zero, a new coordinate pointer is computed in step 146 by adding the field length to the current value of the coordinate pointer. In step 147 this new coordinate pointer value is compared to a maximum value to determine whether the entire field can be included on the display screen. If not, then in step 148 a return code is set to indicate that the screen size has been exceeded and execution returns to the application program. It is anticipated that such a return will indicate an error condition, although it would be possible to use such a return for using the same format for displaying a data base having a length that was unknown at the time the screens were defined.

Considering now the usual case in which the entire field can be placed on the display screen, in step 149 the "updatable" or "U" flag is tested to determine whether the field is an "output only" field or whether it is updatable. If the "U" flag is not set, then in step 150 an "output only" field command is transmitted to the display interface along with the current value of the coordinate pointer, the length of the field and the number of characters indicated by the length from the data value associated with the field record. Otherwise, if the "U" flag is set, then an "input-output" field command is transmitted to the display along with the current value of the coordinate pointer, the length and the number of characters indicated by the length from the data value associated with the field record.

In order to keep a record of the coordinates determined for each of the fields being displayed, the data base key of the current field record is placed into the coordinate table (36 in FIG. 1) in association with the value of the coordinate pointer. As will be further described below, this coordinate table is used for determining the fields having contents that have been changed by data entered or edited by the user. Next, in step 153, the coordinate pointer is updated by being set to the new coordinates having been calculated in step 146. Finally, in step 154, the new data flag (N) is set, and the "S" flag is cleared.

Figure 10:
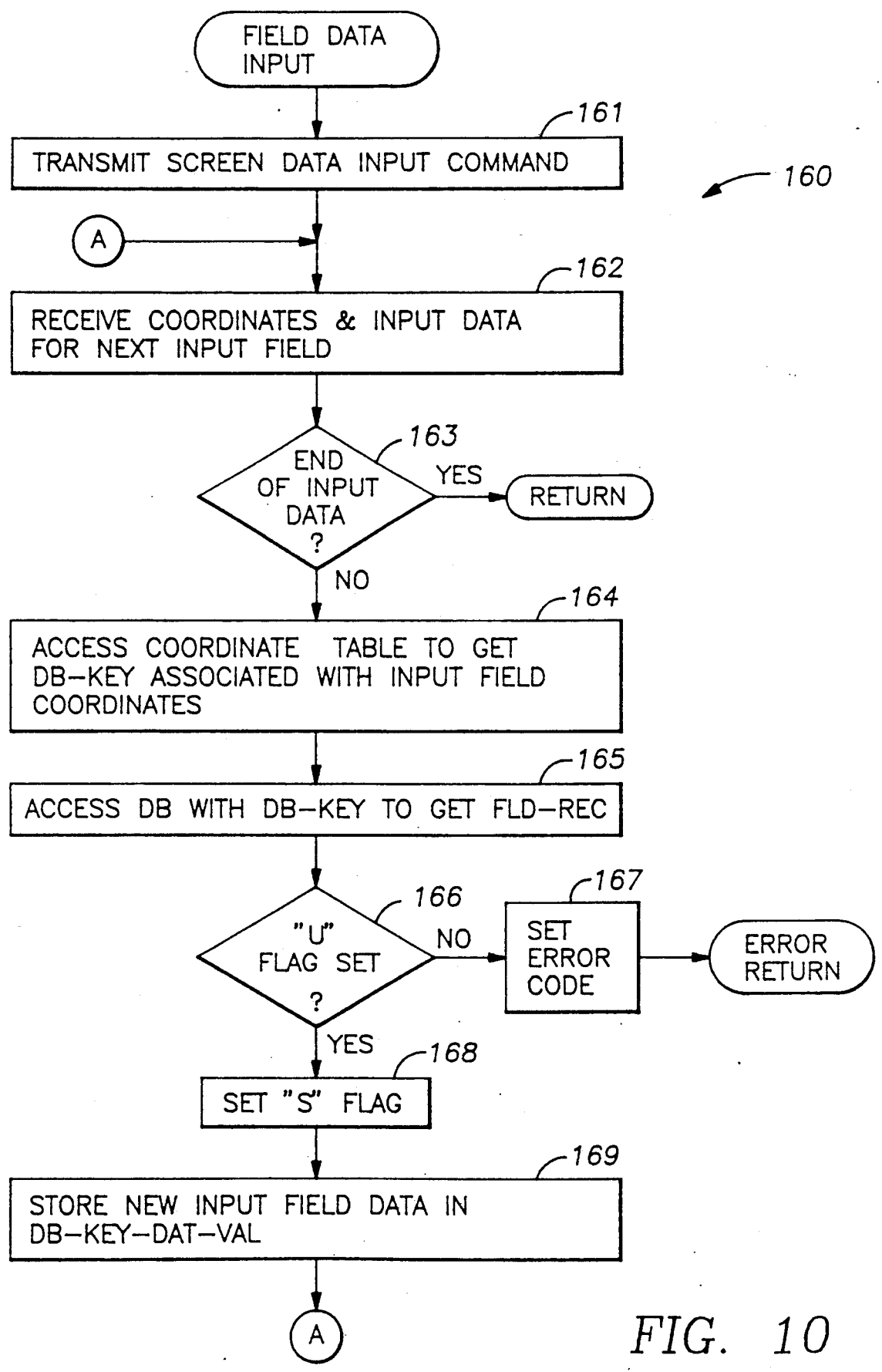
FIG. 10 is a flowchart of a procedure by which the flexible display generator of FIG. 1 receives data entered by the user into selected fields on the display of the data terminal.

Turning now to FIG. 10 there is shown a flowchart of the subroutine which is called to permit the user to enter or edit data into the updatable fields on the display screen. In the first step 161 the flexible display generator transmits a screen data input command to the display interface utility 24. This is done, for example, by a subroutine call to the procedure shown in the flowchart 80 of FIG. 5. Upon return from that subroutine call, in step 162 the display generator receives the first or the next set of coordinates and input data for the next input field. In step 163 execution returns at the end of the input data. Otherwise, the input data is stored as a new data value associated with the field record for the input data field. For this purpose in step 164 the coordinate table is accessed to get the data base key associated with the input field coordinates provided by the display interface utility. When that data base key is obtained, the data base is accessed in step 165 to get that field record. In step 166 the updatable or "U" flag is tested to ensure that record is in fact updatable. If it is not, then an error has occurred and that error is reported by setting an error code in step 167 and returning to an error handler. Otherwise, in step 168 the "S" flag is set to indicate that new data has been received from the user. Finally, in step 169 the new input field data is stored in the data value associated with the field record. Execution then returns to step 162 to process the input data associated with any other input field.

After data is entered by the user, it is checked against the valid data criterion or legal values linked to the field records. In addition, all of the field records for the current display are checked to ensure that every required field has been filled with valid data. In addition, when either one of these error conditions is found to exist, the coordinates of the field having the error or which has not been updated are used to position the cursor at that field to permit the user to enter valid data.

Since the checking procedure must check all of the updatable field records which make up the display, the records could be checked by accessing the coordinate table for all of the records. This would require, however, the coordinate table to be cleared every time that a display is created. Alternatively, the field records for the current display can be obtained by searching through the hierarchy of display information by a procedure similar to that shown in FIG. 7. In other words, the procedure of FIG. 7 is used but the field record and its associated data values are checked in step 114 instead of displaying the data values.

Figure 11:
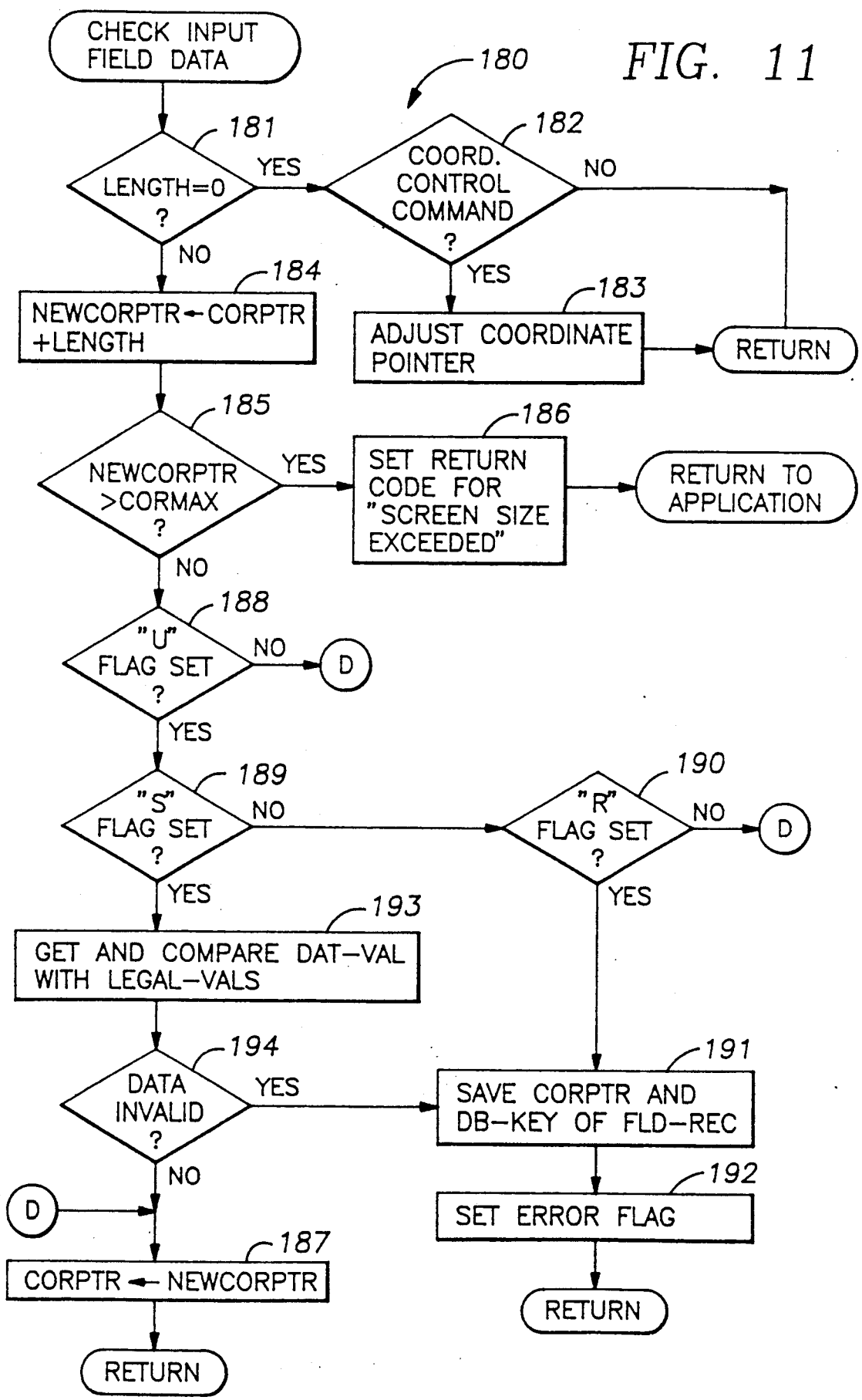
FIG. 11 is a flowchart of a procedure used by the flexible display generator to validate the data values for updatable data fields after the user has had the opportunity to edit the updatable fields.

Turning now to FIG. 11, there is shown a flowchart 180 of a subroutine that is called to check input data associated with a field record. This subroutine includes the necessary steps for recalculating the coordinates associated with the field record. These steps include a step 181 for testing whether the length of the field is equal to zero, a step 182 for detecting any coordinate control command, a step 183 for adjusting the coordinate pointer when there is a coordinate control command, a step 184 for computing the new value of the coordinate pointer, a step 185 for comparing the new value of the coordinate pointer to the maximum value, a step 186 for setting the return code and returning to the application if the screen size is exceeded, and a final step 187 for setting the coordinate pointer to the new coordinate value. The other steps in the flowchart 180 do the actual checking of the record.

In step 188, the error checking is finished if the updatable or "U" flag is not set. In this case, it is assumed that the data initially programmed for the field is valid. Otherwise, in step 189 the "S" flag is inspected. If this flag is not set, then the user has not entered or edited data for the current field. In this case, the required or "R" flag is tested in step 190. If the "R" flag is set, then an error has occurred since the user has failed to enter required data. Therefore, in step 191 the coordinate pointer and the data base key of the field record are saved in order the permit the application to display an error message corresponding to the field record and put the cursor on the erroneous field, as shown in step 46 of FIG. 2. Also, when an error is detected, an error flag is set in step 193 to tell the calling routines that an error has been detected.

If in step 189 it was detected that the "S" flag was set, then in step 193 the data value linked to the current field record is compared to the legal values also linked to the current field record. The legal values may specify that the data values must be numeric, or that in addition the numeric values must fall within certain ranges or assume certain discrete values. Likewise, the legal values may specify that alphanumeric data must assume particular values such as "Y" or "N" for yes or no. If this comparison indicates in step 194 that the data is invalid, then execution branches to step 190 to record and indicate the error. Otherwise, the error checking procedure is finished and execution returns after the coordinate pointer is updated in step 187.

In view of the above, there has been described a method and system for building display screens and receiving user data entered into display screens in such a way that the content and format of the display screens is readily adapted to a specific application or modified during the design, development and maintenance of the application program. The programmer need not specify screen coordinates when laying out or modifying the placement of the fields on the display screens. Instead, the format of the data base itself governs how the data is displayed on the screen. This format is readily apparent to the programmer in terms of lists of field records and lists of groups of such field records. Fields in the display are easily added or removed by adding or removing records from the lists of field records. The data value associated with each field record is also easily changed by changing pointers. In addition, the attributes of the display field are controlled by flags which are easily reprogrammed. The method is readily adapted to displaying the attributes of assemblies and subassemblies or other objects that are related according to a hierarchy. In this case, the display information may reside in records of a hierarchical data base that stores other information about the assemblies and subassemblies.

APPENDIX I

INSTRUCTION AND OPTIONS FOR PANELBOARD SELECTION

COPYRIGHT © 1988 SQUARE D COMPANY

NAMEPLATE: Select Option. If namepate engraving is is different than designation, advise in remarks waht is required.

S.C. RATING: Enter short circuit rating of system in thousands of RMS amperes. (Example: Enter 10 for 10,000).

PANEL TYPE: If nothing selected system will provide least expensive that meets specs.

MB TYPE: Enter main breaker type if other than standard required (Example: FA, KA, LA, IF, etc.).

C/B ACCESSORIES: Select from the following circuit breaker accessories:

1. Shunt Trip (ST)
2. Ground Fault (GFI)
3. Energy Management (Motor Operated)
4. Ground Fault Shunt Trip (GFST)
5. Undervoltage (UV)
6. Auxilliary Contact (Aux. Cont)
7. Alarm Switch
8. Key Operated (KEY)
9. Switch Neutral (SWN)
10. Handle Tie
11. Handle Lock-Off
12. Other (Describe and Enter Manual Price)

ACCESSORIES VOLTAGE: If accessory is selected enter voltage if required.

BOX WIDTH/DEPTH: System will provide standard for panel unless specific size selected.

1. STD. FOR PANEL
2. 20 x 5 3/4
3. 14 x 5 3/4
4. 14 x 4
5. 8 5/8 x 5
6. 6 7/8 x 5

If special box requires addition price, this must be added manually. Specify under REMARKS.

WIRE SIZE:    Oversize lugs require manual pricing.

QMB ACCESSORIES:    Select from the following QMB Main and Branch accessories.
1. Electrical Interlocks (Branch Switches) (30-200 AMP only)
2. Push Button 9001 Type K (Wired)
3. Pilot Light 9001 Typ KP (Wired)
4. Additional Electrical Interlock
5. Control Circuit Transformer with Fuse Block 60 HZ (Wired)
6. Bimetallic Overload Relays
7. Nameplate (Describe in Remarks)
8. Others (Describe and Manually Price)

BRANCHES

S/O:    Place an X if space only.

TYPE:    Enter branch breaker type if other than standard is required. (Example: FA, FH, QO, IF, etc.).

If panel is QMB, F/S will be assumed unless C/B (#1) is entered.
1. Circuit Breaker FUSE CLIP:    To be used for QMB panels only.
Select Option:
1. Standard
2. Class R
3. Class T
4. Class J FUSE SIZE:    To be used for QMB panels only. Enter amperage of fuse. (Information only).

AIC:    Enter AIC of branch device if different from S.C. Rating entered above or other than standard for selected panel type.

CKT.NO.:    If specific circuit breaker locations are required enter circuit number.

SPECIAL FEATURES:    Select Option: (Option #20. PB-1 must be described and priced manually. Enter under MANUAL PRICE ADDER.)
1. Contactor in Main
2. Copper Ground Bar
3. Copper Neutral Assemblies
4. Isolated Ground Bar
5. VCEL Lugs (std type)
6. Split Bus Bars
7. Sub Feed Lugs
8. Thru Feed Lugs
9. Time Switches
10. Blank End Walls
11. Gasketed Fronts (Calculated)
12. Ground Lugs
13. Increased Box Depth
14. Increased End Gutters
15. Increased Side Gutters
16. Ambient Temperature
17. Hertz
18. Door in Door Construction
19. Cable Trough
20. Other (Describe in Remarks)

MANUAL PRICE ADDER: Enter Prices (Determined Mannually)

REMARKS: May consist of anything or any description pertaining to the specific panel. Also may be used for additional information needed for special features (i.e. voltage for shunt trip or number of n.o. n.c. contacts), Main breaker or Branch accessories or nameplate information.

APPENDIX II

PRODUCT SELECTION SCREEN

PRODUCT SELECTION COPYRIGHT © 1988 SQUARE D COMPANY

```
*    SUB-PROJECT    ##   *****************************************
*    ALTERNATIVE    ##   *****************************************

*   ADD    *  REVISE
```

ENTER AN "X" TO SELECT TYPE OF PRODUCT

| | | | |
|---|---|---|---|
| * | ASSEMBLED PANELBOARDS | * | UNASSEMBLED PANELBOARDS |
| * | SWITCHBOARDS | * | PDS MERCHANISE |
| * | METERING AND LOAD CENTERS | * | MOTOR CONTROL CENTERS |
| * | BUSWAY | * | RACEWAY |
| * | ASSEMBLED PRODUCTS | * | PROGRAMMABLE CONTROLS |
| * | HV SWITCHGEAR | * | POWER TRANSFORMERS |
| * | CRANE CONTROL | * | LVDO SWITCHGEAR |
| * | MV CONTROL | * | MVDO SWITCHGEAR |
| * | HOSPITAL PANELS | * | HOSPITAL WALLS |

ITEM NUMBER:     ####

DESIGNATION:     *******************************************

F1=HELP  F10=CONTINUE  ALT F10=DUNSPLUS  F4=BACKUP F5=FINISH

APPENDIX III

PANELBOARD SELECTION SCREEN

PANELBOARD SELECTION COPYRIGHT © 1988 SQUARE D COMPANY

```
DESIGNATION:       *******************************************
QUANTITY:          0001                            OPTIONS
S.C. RATING:       01       STANDARD        **.  ***********
S/E LABEL:         2        NO              **.  ***********
PANEL TYPE         *        ******          **.  ***********
VOLTAGE:           *        *********       **.  ***********
PHASE/WIRE         2        3PH/4WIRE       **.  ***********
MAIN RATING        *        #### AMP.       **.  ***********
MAIN TYPE:         *        **              **.  ***********
MAIN BREAKER TYPE. *        *******         **.  ***********
MAIN ACCESSORIES:  2        NO              **.  ***********
BRANCH MOUNTING:   2        PLUG-ON         **.  ***********
NAMEPLATE:         2        NO     QTY ###  **.  ***********
BUS:               1        STANDARD        **.  ***********
GROUND BAR:        2        NO              **.  ***********
BOX WIDTH/DEPTH:   01       STANDARD        **.  ***********
BOX TYPE:          1        NEMA 1          **.  ***********
FEED:              *        ******          **.  ***********
TRIM:              *        *******         **.  ***********
SPECIAL FEATURES:  2        NO              **.  ***********
```

F1=HELP F10=CONTINUE  ALT F10=DUNSPLUS  F5=FINISH F4=REPEAT ENTER=MORE

APPENDIX IV

MAIN ACCESSORIES SCREEN

MAIN ACCESSORIES COPYRIGHT © 1988 SQUARE D COMPANY

```
*    3.   SHUNT TRIP                      ### VOLTAGE
*    4.   GROUND FAULT SHUNT TRIP         ### VOLTAGE
*    5.   GROUND FAULT MODULE
*    6.   UNDERVOLTAGE TRIP               ### ** VOLTAGE
*    7.   AUXILIARY CONTACT               * N.O. * N.C.
*    8.   ALARM SWITCH
*    9.   OTHERS ****************************  $ #######
```

F1=HELP  F10=CONTINUE   ALT F10=DUNSPLUS

APPENDIX V

SPECIAL FEATURES SCREEN

PANELBOARD SPECIAL FEATURES COPYRIGHT © 1988 SQUARE D COMPANY

```
*    1.   LIGHTING CONTRACTOR     OPT #    DET #    ## AMP
*    2.   COPPER GROUND BAR
*    3.   COPPER NEUTRAL ASSEMBLIES                              OPTIONS
*    4.   ISOLATED GROUND BAR
*    5.   VCEL LUGS (STD TYPE)                                #. ********
*    6.   SPLIT BUS BARS                                      #. ***********
*    7.   SUB FEED LUGS                       ### AMP         #. ***********
*    8.   THRU FEED LUGS                      ### AMP         #. ***********
*    9.   TIME SWITCHES           OPT #   DET #   *** LATITUDE #. ***********
*   10.   BLANK ENDWALLS                                         DETAIL
*   11.   GASKETED FRONTS                                      #. ***********
*   12.   GROUND LUGS             OPT #       #### CABLE SIZE #. ***********
*   13.   INCREASED BOX DEPTH                 ### INCHES      #. ***********
*   14.   INCREASED END GUTTERS   OPT #       ### INCHES      #. ***********
*   15.   INCREASED SIDE GUTTERS              ## INCHES
*   16.   AMBIENT TEMPERATURE                 ### C DEGREES
*   17.   HERTZ                               ### HZ
*   18.   DOOR IN DOOR CONSTRUCTION
*   19.   CABLE THROUGH                       ### INCHES
*   20.   PB-1 SPECIALS
*   21.   REMARKS *******************************************************
***************************************************************************
```

F1=HELP  F10=CONTINUE   F4=BACKUP  ENTER=PB-1  SPEC FEATURES   ALT F10=DUNSPLUS

APPENDIX VI

BRANCHES SCREEN

BRANCHES COPYRIGHT © 1988 SQUARE D COMPANY

| QTY | AMP | P | S/O | TYPE | FUSE CLIP | FUSE SIZE | ACCESS | AIC | CKT |
|-----|-----|---|-----|------|-----------|-----------|--------|-----|-----|
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |
| ### | ### | # | * | ******** | * | ### | * | ###K | #### |

| QTY | AMP | P | S/O | TYPE | FUSE CLIP | FUSE SIZE | ACCESS | AIC | CKT |
|-----|-----|---|-----|------|-----------|-----------|--------|-----|-----|
| ### | ### | # | * | ******* | * | #### | * | ###K | ##### |
| ### | ### | # | * | ******* | * | #### | * | ###K | ##### |
| ### | ### | # | * | ******* | * | #### | * | ###K | ##### |
| ### | ### | # | * | ******* | * | #### | * | ###K | ##### |
| ### | ### | # | * | ******* | * | #### | * | ###K | ##### |

F1=HELP  F2=PAGE FWD  F3=PAGE BWD  F10=CONT  F5=FINISH  ALT F10=DUNS  F4=REPEAT

APPENDIX VII

BRANCH ACCESSORIES SCREEN

BRANCH ACCESSORIES COPYRIGHT © 1988 SQUARE D COMPANY

```
* 1.    GROUND FAULT (GFI)        ###  VOLTAGE
* 2.    GROUND FAULT SHUNT TRIP   ###  VOLTAGE
* 3.    ENERGY MANAGEMENT         ###  AMPERAGE
* 4.    SHUNT TRIP                ###  VOLTAGE
* 5.    UNDERVOLTAGE TRIP         ### ** VOLTAGE
* 6.    KEY OPERATED (KEY)
* 7.    SWITCH NEUTRAL (SWN)
* 8.    ALARM SWITCH
* 9.    HANDLE TIE
* 10.   HANDLE LOCK-OFF
* 11.   OTHERS              *******************   $ ########
```

F1=HELP  F10=CONTINUE  ALT F10=DUNSPLUS

APPENDIX VIII

QMB ACCESSORIES SCREEN

QMB ACCESSORIES SCREEN COPYRIGHT © 1988 SQUARE D COMPANY

```
* 3.    ELECTRICAL INTERLOCKS (BRANCH SWITCHES)       # N.O.    # N.C.

* 4.    PUSH BUTTON  9001 TYPE K (WIRED)

* 5.    PILOT LIGHT  9001 TYPE KP (WIRED)             * RED     * GREEN

* 6.    ADDITIONAL ELECTRICAL INTERLOCK

* 7.    CONTROL CIRCUIT TRANSFORMER WITH FUSE BLOCK   ### VOLTS
           60 HZ (WIRED)
* 8.    BIMETALLIC OVERLOAD RELAYS

* 9.    NAMEPLATE (DESCRIBE IN REMARKS)

* 10.   OTHERS              ******************   $#######

* 11.   REMARKS  *************************************************
        *************************************************
```

F1=HELP  F10=CONTINUE  ALT F10=DUNSPLUS

APPENDIX IX

FIELD RECORDS FOR THE "MAIN ACCESSORIES"
SCREEN WHEN AN "I-LINE" TYPE PANELBOARD HAS
BEEN SELECTED COPYRIGHT © 1988 SQUARE D COMPANY

| FIELD | R | U | GLOSSARY NAME |
|---|---|---|---|
| ALARM SWITCH<br>- SELECT | O | U | EQSDATELE - ALARM SWITCH |
| AUXILIARY CONTACT<br>- SELECT | O | U | EQSDATELE - AUXILIARY CONTACT |
| AUXILIARY CONTACT<br>SETS | O | U | EQSDATELE - SETS |
| ERROR MESSAGES | | | ERRMSG1 |
| GROUND FAULT<br>SHUNT TRIP<br>- SELECT | O | U | EQSDATELE - GROUND FAULT<br>SHUNT TRIP |
| HANDLE LOCK-OFF<br>- SELECT | O | U | EQSDATELE - HANDLE LOCK-OFF |
| INTEGRAL GROUND<br>FAULT<br>- SELECT | O | U | EQSDATELE - INTEGRAL GROUND<br>FAULT |
| OTHER<br>- SELECT | O | U | EQSDATELE - OTHER |
| OTHER DESCRIPTION | O | U | DATA ENTRY |
| OTHER PRICE | O | U | DATA ENTRY |
| SHUNT TRIP<br>- SELECT | O | U | EQSDATELE - SHUNT TRIP |
| UNDERVOLTAGE TRIP<br>- SELECT | O | U | EQSDATELE - UNDERVOLTAGE TRIP |

O = OPTIONAL
U = UPDATABLE

APPENDIX X

FIELD RECORDS FOR THE "MAIN ACCESSORIES" SCREEN WHEN AN "NEHB" TYPE PANELBOARD HAS BEEN SELECTED COPYRIGHT © 1988 SQUARE D COMPANY

| FIELD | R | U | GLOSSARY NAME |
|---|---|---|---|
| ALARM SWITCH – SELECT | O | U | EQSDATELE – ALARM SWITCH |
| AUXILIARY CONTACT – SELECT | O | U | EQSDATELE – AUXILIARY CONTACT |
| AUXILIARY CONTACT N.O. | O | U | EQSDATELE – N.O. |
| AUXILIARY CONTACT N.C. | O | U | EQSDATELE – N.C. |
| ERROR MESSAGES | | | ERRMSG1 |
| GROUND FAULT SHUNT TRIP – SELECT | O | U | EQSDATELE – GROUND FAULT SHUNT TRIP |
| HANDLE LOCK-OFF – SELECT | O | U | EQSDATELE – HANDLE LOCK-OFF |
| OTHER – SELECT | O | U | EQSDATELE – OTHER |
| OTHER DESCRIPTION | O | U | DATA ENTRY |
| OTHER PRICE | O | U | DATA ENTRY |
| SHUNT TRIP – SELECT | O | U | EQSDATELE – SHUNT TRIP |
| SHUNT TRIP – CONTROL VOLTAGE | O | U | EQSDATELE – CONTROL VOLTAGE |
| SHUNT TRIP AC OR DC | O | U | EQSDATELE – AC OR DC |
| UNDERVOLTAGE TRIP – SELECT | O | U | EQSDATELE – UNDERVOLTAGE TRIP |
| UNDERVOLTAGE TRIP CONTROL VOLTAGE | O | U | EQSDATELE – CONTROL VOLTAGE |
| UNDERVOLTAGE TRIP AC OR DC | O | U | EQSDATELE – AC OR DC |

O = OPTIONAL
U = UPDATABLE

APPENDIX XI

FIELD RECORDS FOR THE "MAIN ACCESSORIES" SCREEN WHEN A NQOD" TYPE PANELBOARD HAS BEEN SELECTED COPYRIGHT © 1988 SQUARE D COMPANY

| FIELD | R | U | GLOSSARY NAME |
|---|---|---|---|
| AUXILIARY CONTACT - SELECT | O | U | EQSDATELE - AUXILIARY CONTACT |
| AUXILIARY CONTACT SETS | O | U | EQSDATELE - SETS |
| ERROR MESSAGES | | | ERRMSG1 |
| GROUND FAULT SHUNT TRIP - SELECT | O | U | EQSDATELE - GROUND FAULT SHUNT TRIP |
| OTHER - SELECT | O | U | EQSDATELE - OTHER |
| OTHER DESCRIPTION | O | U | DATA ENTRY |
| OTHER PRICE | O | U | DATA ENTRY |
| SHUNT TRIP - SELECT | O | U | EQSDATELE - SHUNT TRIP |

O = OPTIONAL
U = UPDATABLE

We claim:

1. A method of operating a data processing system for building a series of display screens such that content and format of said display screens is readily adapted for a specific application in response to suer input and data base format changes; said data processing system including a data display terminal, said data display terminal including means for displaying alphanumeric characters at specified screen coordinates and means for enabling a user to enter alphanumeric data; a central processing unit; and a memory; an application program stored in said memory and executed by said central processing unit, and a data base stored in said memory; said data base including a plurality of definitions of field of alphanumeric characters to be displayed by said display terminal, some of said fields being defined as output only fields and others of said fields being defined as updatable fields, and definitions of sequences of said fields including a definition of a respective sequence of said fields for each one of said display screens, wherein each one of said display screens is displayed by simultaneously displaying the respective sequence of said fields for said each one of said display screens; said method comprising successively displaying said display screens by successively performing, for each one of said display screens, the steps of:

(a) reading said data base to obtain the definition of the respective sequence of said fields to be displayed simultaneously by said display terminal as said each one of said display screens;

(b) reading said data base to obtain said definitions of said fields of alphanumeric characters to be displayed simultaneously to obtain information about said fields of alphanumeric characters to be displayed simultaneously;

(c) computing respective screen coordinates for said fields of alphanumeric characters to be displayed simultaneously in response to said respective sequence of said fields of alphanumeric characters to be displayed simultaneously and said information about said fields of alphanumeric characters to be displayed simultaneously;

(d) transmitting said respective screen coordinates of said fields of alphanumeric characters to be displayed simultaneously along with said information about said fields of alphanumeric characters to be displayed simultaneously to said means for displaying to thereby simultaneously display said fields of alphanumeric characters to be displayed simultaneously; and (e) displaying alphanumeric data entered by said user in selected ones of said fields defined as updatable and preventing alphanumeric data entered by said user from being displayed in said fields defined as output only fields.

2. The method as claimed in claim 1, wherein said data display terminal includes means for indicating a cursor position at which the alphanumeric data entered by said user is displayed, said computed coordinates of said updatable fields are recorded in said memory in associated with originally displayed data of their respective fields, and said method further comprises the steps of correlating said alphanumeric data entered by said user with said originally displayed data by accessing said computed coordinates recorded in said memory and comparing said originally displayed data with said alphanumeric data entered by said user at said cursor position to determine the respective fields into which said user has entered said data.

3. The method as claimed in claim 2, wherein said memory includes a plurality of respective storage locations for storing alphanumeric data associated with said updatable fields, said respective storage locations are accessed after said definitions of said fields are read in step (b) to obtain alphanumeric data to be transmitted to said means for displaying in step (d) to be displayed in the respective fields of said display screen, and after said updatable fields into which said user has entered alphanumeric data have been determined, storing the alphanumeric data entered by said user in said respective storage locations for said updatable fields.

4. The method as claimed in claim 1, wherein definitions of said sequences of said fields include lists of a plurality of groups, each of said groups including a list of field records defining said sequence of said fields to be displayed simultaneously in one of said display screens.

5. The method as claimed in claim 4, wherein each of said field definitions includes a respective display flag "D", said fields are selectively displayed in accordance with the state of their respective display flags, and each of said groups defining said display screens also are associated with a respective display flag "D", and said groups are selectively displayed in accordance with the state of their respective display flags.

6. The method as claimed in claim 4, wherein the definition of each of said fields is stored in a respective field record of said data base, said list of field records defining said sequences of said fields includes a respective record pointer for each of said fields, said records in said lists are read by sequential access of said data base to obtain said record pointers, and said data base is also read by random access using the record pointers as data base keys.

7. The method as claimed in claim 6, wherein said data base is read by the steps of:
  (i) reading a record of a first record pointer in a first one of said lists by sequential access of said data base using a data base key provided by said application program to obtain said first record pointer;
  (ii) saving in said memory a current value of said data base key indicating a current position in a display list;
  (iii) setting the value of said data base key to the value of said first record pointer;
  (iv) reading said data base by random key access to obtain the record pointed to by said first record pointer;
  (v) restoring said data base key with the saved value indicating the current position in said display list having been saved in said memory in step (ii);
  (vi) reading said data base by sequential access to obtain a second record pointer in said first one of said lists.

8. The method as claimed in claim 7, wherein said data base key is saved by pushing the value of said key onto a stack, and said data base key is restored by popping the value of said key from said stack.

9. The method as claimed in claim 8, wherein a recursive subroutine call is performed after said data base key value is saved and before said data base key value is restored.

10. The method as claimed in claim 1. wherein each of said updatable field definitions includes a flag "R" indicating whether said user is required to enter data into the respective updatable field.

11. The method as claimed in claim 10, wherein each updatable field definition is stored in a data base record that also includes a respective flag indicating whether the user has entered data into the respective updatable field.

12. The method as claimed in claim 1, wherein said field record defining each of said fields includes a number indicating the number of alphanumeric characters to be included in the field, and a link to a storage location in memory storing codes for said alphanumeric characters.

13. A data processing system for building a series of display screens having a content and format that is readily adaptable to a specific application in response to user input and data base format changes, said data processing system including a data display terminal, said data display terminal including means for displaying alphanumeric characters at specified screen coordinates and means for enabling a user to enter alphanumeric data; a memory holding a hierarchical data base including a hierarchy of display knowledge including a lower level including definitions of fields of alphanumeric characters for display by said display terminal, some of said fields being defined as output only fields and others of said fields being defined as updatable fields, an intermediate level defining respective sequences of said fields for simultaneous display by said display terminal, and an upper level defining individual display screens as combinations of said respective sequences of said fields, said memory also holding an application program defining said specific application and referencing said hierarchical data base; and processor means including means for interpreting said hierarchical data base to obtain said sequence of said fields, means for computing respective screen coordinates for said fields in response to said sequence of fields and said definitions of said fields, means for transmitting said respective coordinates of said fields along with information from said field definitions to said means for displaying to thereby simultaneously display said fields of alphanumeric characters, means for displaying the alphanumeric data entered by said user in selected ones of said fields defined as updatable and preventing alphanumeric data entered by said user from being displayed in said fields defined as output only fields, and means for executing said application program for displaying a series of said display screens defined by the upper level of s... hierarchical data base, whereby the alphanumeric d... to be displayed in the display screens are separate from the display knowledge that specifies how the alphanumeric data are to be displayed in the display screens.

14. A method of operating a data processing system including a data display terminal, said data display terminal including means for displaying alphanumeric characters at specified screen coordinates; a central processing unit; and memory storing a program executed by said central processing unit, and a data base including definitions of fields of alphanumeric characters to be displayed by said display terminal, and a definition of a sequence of said fields to be displayed by said display terminal simultaneously as a single display screen, said method comprising the steps of:

(a) reading said data base to obtain said definitions of the sequence of said fields to be displayed by said display terminal;

(b) reading the data base to obtain the definition of the fields of alphanumeric characters to obtain information about said fields;

(c) computing respective screen coordinates for said fields in response to said sequence of said fields and said information about said fields; and (d) transmitting said respective screen coordinates of said fields along with said information about said fields to said means for displaying to thereby simultaneously display said fields of alphanumeric characters;

wherein said definition of said sequence of said fields to be displayed includes groups of lists of said field records, and a list of said groups; and wherein said field definitions each includes a display flag and said fields are selectively displayed in accordance with the state of their respective display flags, and said groups of lists also are associated with respective display flags, and said groups are selectively displayed in accordance with the state of their respective display flags.

15. A method of operating a data processing system including a data display terminal, said data display terminal including means for displaying alphanumeric characters at specified screen coordinates; a central processing unit; and memory storing a program executed by said central processing unit, and a data base including definitions of fields of alphanumeric characters to be displayed by said display terminal, and a definition of a sequence of said fields to be displayed by said display terminal simultaneously as a single display screen; said method comprising the steps of:

(a) reading said data base to obtain said definitions of the sequence of said fields to be displayed by said display terminal;

(b) reading the data base to obtain the definition of the fields of alphanumeric characters to obtain information about said fields;

(c) computing respective screen coordinates for said fields in response to said sequence of said fields and said information about said fields; and (d) transmitting said respective screen coordinates of said fields along with said information about said fields to said means for displaying to thereby simultaneously display said fields of alphanumeric characters;

wherein said definition of said sequence of said fields to be displayed includes groups of lists of said field records, and a list of groups; and wherein the definitions of said fields are stored in respective field records of said data base, said lists include sequences of records storing respective record pointers, said records in said lists are read by sequential access of said data base to obtain the record pointers, and the data base is also read by random access using the record pointers as data base keys.

16. The method as claimed in claim 15, wherein said data base is read by the steps of:

(i) reading a record of a first record pointer in a first one of said lists by sequential access of said data base using a data base key to obtain said first record pointer;

(ii) saving the value of said data base key in memory;

(iii) setting the value of said data base key to the value of said first record pointer;

(iv) reading said data base by random key access to obtain the record pointed to by said first record pointer;

(v) restoring the data base key with the value having been saved in memory; and (vi) reading said data base by sequential access to obtain a second record pointer in said first one of said lists.

17. The method as claimed in claim 16, wherein said data base key is saved by pushing the value of said key onto a stack, and said data base key is restored by popping the value of said key from said stack.

18. The method as claimed in claim 17, wherein a recursive subroutine call is performed after said data base key is saved and before said data base key is restored.

19. A method of operating a data processing system including a data display terminal, said data display terminal including means for displaying alphanumeric characters at specified screen coordinates; a central processing unit; and memory storing a program executed by said central processing unit, and a data base including definitions of fields of alphanumeric characters to be displayed by said display terminal, and a definition of a sequence of said fields to be displayed by said display terminal simultaneously as a single display screen; said method comprising the steps of:

(a) reading said data base to obtain said definitions of the sequence of said fields to be displayed by said display terminal;

(b) reading the data base to obtain the definition of the fields of alphanumeric characters to obtain information about said fields;

(c) computing respective screen coordinates for said fields in response to said sequence of said fields and said information about said fields; and (d) transmitting said respective screen coordinates of said fields along with said information about said fields to said means for displaying to thereby simultaneously display said fields of alphanumeric characters;

wherein said data terminal includes means for said user to enter data into selected fields displayed by said display terminal, and each of said field definitions include a flag indication whether the user is required to enter data into the respective field and a flag indicating whether the user is permitted to enter data into the respective field.

20. The method as claimed in claim 19, wherein each field definition is stored in a data base record that also includes a respective flag indicating whether the user has entered data into the respective field.

21. A method of operating a data processing system including a data display terminal, said data display terminal including means for displaying alphanumeric characters at specified screen coordinates; a central processing unit; and memory storing a program executed by said central processing unit, and a data base including definitions of fields of alphanumeric characters to be displayed by said display terminal, and a definition of a sequence of said fields to be displayed by said display terminal simultaneously as a single display screen; said method comprising the steps of:

(a) reading said data base to obtain said definitions of the sequence of said fields to be displayed by said display terminal;

(b) reading the data base to obtain the definition of the fields of alphanumeric characters to obtain information about said fields;

(c) computing respective screen coordinates for said fields in response to said sequence of said fields and said information about said fields; and (d) transmitting said respective screen coordinates of said fields along with said information about said fields to said means for displaying to thereby simultaneously display said fields of alphanumeric characters;

wherein said information defining each field includes a number indicating the number of alphanumeric characters to be includes in the field, and a link to a storage location in memory storing codes for said alphanumeric characters.

22. A method of operating a data processing system including a central processing unit and a memory; said memory storing a program executed by said central processing unit, and a hierarchical data base; said hierarchical data base including definitions of fields of alphanumeric characters to be displayed, and a definition of a sequence of fields to be displayed simultaneously on the screen of a display device by displaying said characters at specified screen coordinates, said definition of said sequence including a list of groups of said fields; said method comprising the steps of:

(a) reading said hierarchical data base to obtain said definition of said sequence of fields to be displayed including said list of groups of said fields;

(b) reading said hierarchical data base to obtain the definitions of said fields included in said groups of list to obtain information about said fields; and (c) computing respective screen coordinates for said fields in response to said sequence of said fields and said information about said fields;

wherein said field definitions each includes a display flag and said coordinates of said fields are selectively computed in accordance with the state of their respective display flags.

23. A method of operating a data processing system including a central processing unit and a memory; said memory storing a program executed by said central processing unit, and a hierarchical data base; said hierarchical data base including definitions of fields of alphanumeric characters to be displayed, and a definition of a sequence of fields to be displayed simultaneously on the screen of a display device by displaying said characters at specified screen coordinates, said definition of said sequence including a list of groups of said fields; said method comprising the steps of:

(a) reading said hierarchical data base to obtain said definition of said sequence of fields to be displayed including said list of groups of said fields;

(b) reading said hierarchical data base to obtain the definitions of said fields included in said groups of said list to obtain information about said fields; and (c) computing respective screen coordinates for said fields in response to said sequence of said fields and said information about said fields;

wherein the definitions of said fields are stored in respective field records of said hierarchical data base, said lists include sequences of records storing respective record pointers, said records in said lists are read by sequential access of said hierarchical data base to obtain the record pointers, and the hierarchical data base is also read by random access using the record pointers as data base keys.

24. The method as claimed in claim 23, wherein said hierarchical data base is read by the steps of:

(i) reading a reacord of a first record pointer in a first one of said lists by sequential access of said hierarchical data base using a data base key to obtain said first record pointer;

(ii) saving the value of said data base key in memory;

(iii) setting the value of said data base key to the value of said fist record pointer;

(iv) reading said hierarchical data base by random key access to obtain the record pointed to by said first record pointer;

(v) restoring the data base key with the value having been saved in memory; and (vi) reading said data base by sequential access to obtain a second record pointer in said first one of said lists.

* * * * *